(12) United States Patent
Bushey et al.

(10) Patent No.: US 7,966,176 B2
(45) Date of Patent: *Jun. 21, 2011

(54) SYSTEM AND METHOD FOR INDEPENDENTLY RECOGNIZING AND SELECTING ACTIONS AND OBJECTS IN A SPEECH RECOGNITION SYSTEM

(75) Inventors: Robert R. Bushey, Cedar Park, TX (US); Michael Sabourin, Saint Lambert (CA); Carl Potvin, La Prairie (CA); Benjamin Anthony Knott, Round Rock, TX (US); John Mills Martin, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/603,619

(22) Filed: Oct. 22, 2009

(65) Prior Publication Data

US 2010/0040207 A1 Feb. 18, 2010

Related U.S. Application Data

(63) Continuation of application No. 11/036,201, filed on Jan. 14, 2005, now Pat. No. 7,627,096.

(51) Int. Cl.
*G10L 15/02* (2006.01)
*G10L 15/04* (2006.01)
*G10L 15/08* (2006.01)
*G10L 11/00* (2006.01)
*H04M 1/64* (2006.01)
*H04M 1/658* (2006.01)
*G10L 19/00* (2006.01)
*G10L 23/00* (2006.01)

(52) U.S. Cl. ........ 704/231; 704/236; 704/246; 704/257; 379/80; 379/88.01; 379/88.03; 379/88.04

(58) Field of Classification Search .................. 704/1–7, 704/46–247, 251–257, 270–271, 275–276, 704/E15.001–E15.007, E15.014, E15.019–E15.024; 370/351, 355; 397/70–72, 80, 88.01–88.28, 397/90.01–93.23
See application file for complete search history.

(56) References Cited

U.S. PATENT DOCUMENTS 4,376,874 A * 3/1983 Karban et al. ................ 704/215
(Continued)

FOREIGN PATENT DOCUMENTS

EP 0424015 A2 4/1991
(Continued)

OTHER PUBLICATIONS

U.S. Appl. No. 10/898,722, filed Jul. 23, 2004. (provided in U.S. Appl. No. 11/036,201).
(Continued)

*Primary Examiner* — James S Wozniak
*Assistant Examiner* — David Kovacek
(74) *Attorney, Agent, or Firm* — Toler Law Group

(57) ABSTRACT

A system includes an acoustic input engine configured to accept a speech input, to recognize phonemes of the speech input, and to create word strings based on the recognized phonemes. The system includes a semantic engine coupled to the acoustic engine and operable to identify actions and to identify objects by parsing the word strings. The system also includes an action-object pairing system to identify a dominant entry from the identified actions and the identified objects, to select a complement to the dominant entry from the identified actions and the identified objects, and to form an action-object pair that includes the dominant entry and the complement. The system further includes an action-object routing table operable to provide a routing destination based on the action-object pair. The system also includes a call routing module to route a call to the routing destination.

20 Claims, 3 Drawing Sheets

U.S. PATENT DOCUMENTS

| | | | |
|---|---|---|---|
| 4,618,984 A * | 10/1986 | Das et al. | 704/244 |
| 4,677,569 A * | 6/1987 | Nakano et al. | 704/275 |
| 4,688,195 A * | 8/1987 | Thompson et al. | 706/11 |
| 4,829,576 A * | 5/1989 | Porter | 704/235 |
| 4,953,204 A | 8/1990 | Cuschelg, Jr. et al. | |
| 4,962,535 A * | 10/1990 | Kimura et al. | 704/252 |
| 4,967,405 A | 10/1990 | Upp et al. | |
| 5,231,670 A * | 7/1993 | Goldhor et al. | 704/275 |
| 5,335,269 A | 8/1994 | Steinlicht | |
| 5,530,744 A | 6/1996 | Charalambous et al. | |
| 5,590,186 A | 12/1996 | Liao et al. | |
| 5,732,395 A * | 3/1998 | Silverman | 704/260 |
| 5,799,279 A * | 8/1998 | Gould et al. | 704/275 |
| 5,884,262 A * | 3/1999 | Wise et al. | 704/270.1 |
| 5,953,704 A | 9/1999 | McIlroy et al. | |
| 6,119,101 A | 9/2000 | Peckover | |
| 6,173,266 B1 | 1/2001 | Marx et al. | |
| 6,246,986 B1 * | 6/2001 | Ammicht et al. | 704/270 |
| 6,269,153 B1 | 7/2001 | Carpenter et al. | |
| 6,317,439 B1 | 11/2001 | Cardona et al. | |
| 6,327,343 B1 * | 12/2001 | Epstein et al. | 379/88.01 |
| 6,333,980 B1 | 12/2001 | Hollatz et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,414,966 B1 | 7/2002 | Kulkarni et al. | |
| 6,418,424 B1 | 7/2002 | Hoffberg et al. | |
| 6,434,524 B1 * | 8/2002 | Weber | 704/257 |
| 6,466,654 B1 * | 10/2002 | Cooper et al. | 379/88.01 |
| 6,510,414 B1 | 1/2003 | Chaves | |
| 6,519,562 B1 | 2/2003 | Phillips et al. | |
| 6,529,871 B1 | 3/2003 | Kanevsky et al. | |
| 6,570,967 B2 | 5/2003 | Katz | |
| 6,574,599 B1 * | 6/2003 | Lim et al. | 704/270 |
| 6,581,033 B1 * | 6/2003 | Reynar et al. | 704/231 |
| 6,598,016 B1 * | 7/2003 | Zavoli et al. | 704/251 |
| 6,598,136 B1 | 7/2003 | Norrod et al. | |
| 6,601,027 B1 * | 7/2003 | Wright et al. | 704/235 |
| 6,614,781 B1 | 9/2003 | Elliott et al. | |
| 6,631,186 B1 | 10/2003 | Adams et al. | |
| 6,678,360 B1 | 1/2004 | Katz | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,707,789 B1 | 3/2004 | Arslan et al. | |
| 6,714,631 B1 | 3/2004 | Martin et al. | |
| 6,721,416 B1 | 4/2004 | Farrell | |
| 6,725,199 B2 * | 4/2004 | Brittan et al. | 704/258 |
| 6,731,625 B1 * | 5/2004 | Eastep et al. | 370/352 |
| 6,745,165 B2 * | 6/2004 | Lewis et al. | 704/275 |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,871,179 B1 * | 3/2005 | Kist et al. | 704/275 |
| 6,885,734 B1 | 4/2005 | Eberle et al. | |
| 6,891,932 B2 | 5/2005 | Bhargava et al. | |
| 6,901,366 B1 | 5/2005 | Kuhn et al. | |
| 6,907,119 B2 | 6/2005 | Case et al. | |
| 6,909,708 B1 * | 6/2005 | Krishnaswamy et al. | 370/352 |
| 6,937,975 B1 * | 8/2005 | Elworthy | 704/9 |
| 6,944,593 B2 * | 9/2005 | Kuzunuki et al. | 704/270.1 |
| 7,092,888 B1 * | 8/2006 | McCarthy et al. | 704/277 |
| 7,421,389 B2 | 9/2008 | Reynolds et al. | |
| 2001/0011211 A1 | 8/2001 | Bushey et al. | |
| 2001/0018672 A1 | 8/2001 | Petters et al. | |
| 2001/0032229 A1 | 10/2001 | Hulls et al. | |
| 2001/0034662 A1 | 10/2001 | Morris | |
| 2002/0087310 A1 * | 7/2002 | Lee et al. | 704/251 |
| 2002/0087385 A1 | 7/2002 | Vincent | |
| 2002/0133394 A1 | 9/2002 | Bushey et al. | |
| 2002/0133413 A1 | 9/2002 | Chang et al. | |
| 2002/0143548 A1 * | 10/2002 | Korall et al. | 704/270 |
| 2002/0156699 A1 | 10/2002 | Gray et al. | |
| 2002/0196277 A1 | 12/2002 | Bushey et al. | |
| 2003/0007609 A1 * | 1/2003 | Yuen et al. | 379/88.16 |
| 2003/0026409 A1 | 2/2003 | Bushey et al. | |
| 2003/0115257 A1 * | 6/2003 | Zyarko et al. | 709/203 |
| 2003/0143981 A1 | 7/2003 | Kortum et al. | |
| 2003/0144919 A1 | 7/2003 | Trompette et al. | |
| 2003/0156133 A1 | 8/2003 | Martin et al. | |
| 2003/0187732 A1 | 10/2003 | Seta | |
| 2003/0187773 A1 | 10/2003 | Santos et al. | |
| 2003/0194063 A1 | 10/2003 | Martin et al. | |
| 2003/0202640 A1 | 10/2003 | Knott et al. | |
| 2003/0202643 A1 | 10/2003 | Joseph et al. | |
| 2003/0202649 A1 | 10/2003 | Haug, Jr. et al. | |
| 2003/0204435 A1 | 10/2003 | McQuilken et al. | |
| 2004/0005047 A1 | 1/2004 | Joseph et al. | |
| 2004/0006473 A1 | 1/2004 | Mills et al. | |
| 2004/0032862 A1 | 2/2004 | Schoeneberger et al. | |
| 2004/0032935 A1 | 2/2004 | Mills et al. | |
| 2004/0042592 A1 | 3/2004 | Knott et al. | |
| 2004/0044950 A1 | 3/2004 | Mills et al. | |
| 2004/0066401 A1 | 4/2004 | Bushey et al. | |
| 2004/0066416 A1 | 4/2004 | Knott et al. | |
| 2004/0073569 A1 | 4/2004 | Knott et al. | |
| 2004/0088285 A1 | 5/2004 | Martin et al. | |
| 2004/0103017 A1 | 5/2004 | Reed et al. | |
| 2004/0109555 A1 | 6/2004 | Williams | |
| 2004/0111269 A1 * | 6/2004 | Koch | 704/275 |
| 2004/0117185 A1 * | 6/2004 | Scarano et al. | 704/254 |
| 2004/0125937 A1 | 7/2004 | Turcan et al. | |
| 2004/0125938 A1 | 7/2004 | Turcan et al. | |
| 2004/0125940 A1 | 7/2004 | Turcan et al. | |
| 2004/0161078 A1 | 8/2004 | Knott et al. | |
| 2004/0161094 A1 | 8/2004 | Martin et al. | |
| 2004/0161096 A1 | 8/2004 | Knott et al. | |
| 2004/0174980 A1 | 9/2004 | Knott et al. | |
| 2004/0230438 A1 | 11/2004 | Pasquale et al. | |
| 2004/0240635 A1 | 12/2004 | Bushey et al. | |
| 2004/0243568 A1 | 12/2004 | Wang et al. | |
| 2005/0008141 A1 | 1/2005 | Kortum et al. | |
| 2005/0015197 A1 * | 1/2005 | Ohtsuji et al. | 701/202 |
| 2005/0015744 A1 | 1/2005 | Bushey et al. | |
| 2005/0027535 A1 | 2/2005 | Martin et al. | |
| 2005/0041796 A1 | 2/2005 | Joseph et al. | |
| 2005/0047578 A1 | 3/2005 | Knott et al. | |
| 2005/0049874 A1 * | 3/2005 | Coffman et al. | 704/257 |
| 2005/0055216 A1 | 3/2005 | Bushey et al. | |
| 2005/0058264 A1 | 3/2005 | Joseph et al. | |
| 2005/0075894 A1 | 4/2005 | Bushey et al. | |
| 2005/0078805 A1 | 4/2005 | Mills et al. | |
| 2005/0080630 A1 | 4/2005 | Mills et al. | |
| 2005/0080667 A1 | 4/2005 | Knott et al. | |
| 2005/0131892 A1 | 6/2005 | Knott et al. | |
| 2005/0132262 A1 | 6/2005 | Bushey et al. | |
| 2005/0135595 A1 | 6/2005 | Bushey et al. | |
| 2005/0169453 A1 | 8/2005 | Knott et al. | |
| 2006/0025995 A1 * | 2/2006 | Erhart et al. | 704/239 |
| 2007/0136060 A1 * | 6/2007 | Hennecke et al. | 704/251 |
| 2008/0084975 A1 * | 4/2008 | Schwartz | 379/88.22 |
| 2010/0040207 A1 * | 2/2010 | Bushey et al. | 379/88.03 |

FOREIGN PATENT DOCUMENTS

| | | |
|---|---|---|
| EP | 0424015 A3 | 4/1991 |
| EP | 0424015 B1 | 4/1991 |
| EP | 0876652 A4 | 9/1996 |
| WO | 9726612 | 7/1997 |
| WO | 0137539 A2 | 5/2001 |
| WO | 0137539 A3 | 5/2001 |
| WO | 2004017584 | 2/2004 |
| WO | 2004049222 A2 | 6/2004 |

OTHER PUBLICATIONS

U.S. Appl. No. 10/901,926, filed Jul. 28, 2004. (provided in U.S. Appl. No. 11/036,201).
U.S. Appl. No. 10/901,925, filed Jul. 28, 2004. (provided in U.S. Appl. No. 11/036,201).
U.S. Appl. No. 10/917,233, filed Aug. 12, 2004. (provided in U.S. Appl. No. 11/036,201).
U.S. Appl. No. 10/935,726, filed Sep. 7, 2004. (provided in U.S. Appl. No. 11/036,201).
U.S. Appl. No. 10/999,199, filed Nov. 29, 2004. (provided in U.S. Appl. No. 11/036,201).
U.S. Appl. No. 11/005,498, filed Dec. 6, 2004. (provided in U.S. Appl. No. 11/036,201).
U.S. Appl. No. 11/005,494, filed Dec. 6, 2004. (provided in U.S. Appl. No. 11/036,201).
U.S. Appl. No. 11/010,633, filed Dec. 13, 2004. (provided in U.S. Appl. No. 11/036,201).
U.S. Appl. No. 11/032,495, filed Jan. 10, 2005. (provided in U.S. Appl. No. 11/036,201).
U.S. Appl. No. 10/975,023, filed Oct. 27, 2004. (provided in U.S. Appl. No. 11/036,201).
U.S. Appl. No. 11/036,204, filed Jan. 14, 2005. (provided in U.S. Appl. No. 11/036,201).
U.S. Appl. No. 11/062,100, filed Feb. 18, 2005. (provided in U.S. Appl. No. 11/036,201).
U.S. Appl. No. 11/071,068, filed Mar. 3, 2005. (provided in U.S. Appl. No. 11/036,201).
U.S. Appl. No. 11/086,796, filed Mar. 23, 2005. (provided in U.S. Appl. No. 11/036,201).
U.S. Appl. No. 11/129,051, filed May 13, 2005. (provided in U.S. Appl. No. 11/036,201).
U.S. Appl. No. 11/145,513, filed Jun. 3, 2005. (provided in U.S. Appl. No. 11/036,201).
U.S. Appl. No. 11/173,227, filed Jul. 1, 2005. (provided in U.S. Appl. No. 11/036,201).
U.S. Appl. No. 11/176,972, filed Jul. 7, 2005. (provided in U.S. Appl. No. 11/036,201).
U.S. Appl. No. 11/086,794, filed Mar. 22, 2005. (provided in U.S. Appl. No. 11/036,201).
U.S. Appl. No. 10/966,127, filed Nov. 23, 2004. (provided in U.S. Appl. No. 11/036,201).
U.S. Appl. No. 10/920,719, filed Dec. 13, 2004. (provided in U.S. Appl. No. 11/036,201).
U.S. Appl. No. 10/920,720, filed Aug. 18, 2004. (provided in U.S. Appl. No. 11/036,201).
U.S. Appl. No. 10/948,089, filed Sep. 23, 2004. (provided in U.S. Appl. No. 11/036,201).
U.S. Appl. No. 10/979,784, filed Nov. 2, 2004. (provided in U.S. Appl. No. 11/036,201).
U.S. Appl. No. 11/212,939, filed Aug. 25, 2005. (provided in U.S. Appl. No. 11/036,201).

* cited by examiner

| SYNONYM TABLE | |
|---|---|
| *SPEECH* | *SYNONYM* |
| NEED HELP USING | HOW TO USE |
| I'D LIKE TO GET | ACQUIRE |
| GET OUT OF | CANCEL |
| DISCONNECT | CANCEL |
| I'D LIKE TO KNOW | INQUIRE |
| PROVIDE ME WITH | ACQUIRE |
| GET ME HELP | HOW TO USE |
| HOW MUCH | INQUIRE |

FIG. 4

| | ACTIONS | | | | | |
|---|---|---|---|---|---|---|
| OBJECTS | ACQUIRE | CANCEL | CHANGE | INQUIRE | INFORM | HOW TO USE |
| DSL | X001 | X002 | X003 | X004 | | X005 |
| BASIC SERVICE | X006 | X007 | | X008 | | X009 |
| CALL NOTES | X010 | X011 | | | | X012 |
| CALLER ID | | | X013 | X014 | | |
| BILL | | | | X015 | X016 | |
| PAYMENT | | | X016 | X032 | | X033 |
| OTHER PROVIDERS | | | | X034 | | |
| COUPONS SPECIALS | | | | X035 | | |
| NAME / NUMBER | | | | X036 | | |
| STORE LOCATIONS | | | | X038 | X039 | |
| | | | | | | |

FIG. 5

SYSTEM AND METHOD FOR INDEPENDENTLY RECOGNIZING AND SELECTING ACTIONS AND OBJECTS IN A SPEECH RECOGNITION SYSTEM

CLAIM OF PRIORITY

The present application claims priority from and is a continuation of U.S. patent application Ser. No. 11/036,201 filed on Jan. 14, 2005 and entitled "System and Method for Independently Recognizing and Selecting Actions and Objects in a Speech Recognition System," the contents of which are expressly incorporated herein by reference in their entirety.

FIELD OF THE DISCLOSURE

The present disclosure relates generally to speech recognition and, more particularly, to a system and method for independently recognizing and selecting actions and objects.

BACKGROUND

Many speech recognition systems utilize specialized computers that are configured to process human speech and carry out some task based on the speech. Some of these systems support "natural language" type interactions between users and automated call routing (ACR) systems. Natural language call routing allows callers to state the purpose of the call "in their own words."

A goal of an ACR application may be to accurately determine why a customer is calling and to quickly route the customer to an appropriate agent or destination for servicing. Research has shown that callers prefer speech recognition systems to keypad entry or touchtone menu driven systems.

As suggested above, natural language ACR systems attempt to interpret the intent of the customer based on the spoken language. When a speech recognition system partially misinterprets the caller's intent significant problems can result. A caller who is misrouted is generally an unhappy customer. Misrouted callers often terminate the call or hang-up when they realize that there has been a mistake. If a caller does not hang up they will typically talk to an operator who tries to route the call. Routing a caller to an undesired location and then to a human operator leads to considerable inefficiencies for a business. Many call routing systems handle a large volume of calls and, even if a small percentage of calls are mishandled, the costs associated with the mishandled calls can be significant.

BRIEF DESCRIPTION OF THE DRAWINGS

FIG. 4 is a table that depicts speech input and mapped synonym terms; and

FIG. 5 is a table illustrating action-object pairs and call destinations relating to the action-object pairs.

DETAILED DESCRIPTION

The present disclosure is directed generally to integrating speech enabled automated call routing with action-object technology. Traditional automatic call routing systems assign a correct destination for a call 50% to 80% of the time. Particular embodiments of the disclosed system and method using action-object tables may achieve a correct destination assignment 85 to 95% of the time. In some embodiments, a semantic model may be used to create an action-object pair that further increases call routing accuracy while reducing costs. In particular implementations, the correct call destination routing rate may approach the theoretical limit of 100%. Due to higher effective call placement rates, the number of abandoned calls (e.g., caller hang-ups prior to completing their task) may be significantly reduced, thereby reducing operating costs and enhancing customer satisfaction.

In accordance with the teachings of the present disclosure, a call may be routed based on a selectable action-object pair. In practice, a call is received from a caller and a received speech input is converted into text or "text configurations," which may be the same as, similar to, or can be associated with, known actions and objects. Generally, objects are related to nouns and actions are related to verbs. The converted text may be compared to tables of known text configurations representing objects and actions. A confidence level may be assigned to the recognized actions and objects based on text similarities and other rules. An action-object list may be created that contains recognized actions and objects and their confidence levels. In some embodiments, the entry (action or object) in the list with the highest confidence level may be selected as a dominant item. If an action is dominant a system incorporating teachings disclosed herein may look for a complementary object. Likewise, if an object is dominant, the system may look for a complementary action.

In some implementations, when an action is dominant, remaining actions may be masked and the confidence level of the complementary objects in the action-object list may be adjusted. Conversely, if an object is dominant, the remaining objects may be masked and the confidence level of complementary actions in the action-object list may be adjusted. An adjustment to an assigned confidence level may be based, for example, on the likelihood that the prospective complement in the action-object list is consistent with the dominant entry. Depending upon implementation details, a call may be routed based on a dominant action and a complementary object or a dominant object and a complementary action.

Figure 1:
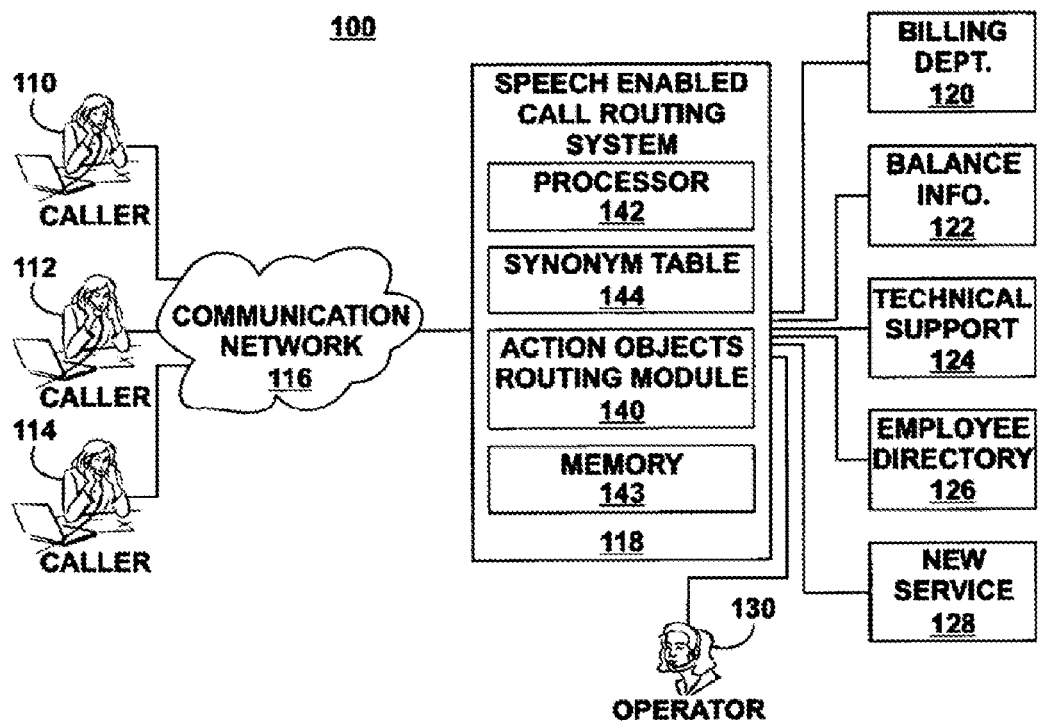
FIG. 1 illustrates a simplified configuration of a telecommunication system.

Referring to FIG. 1, an illustrated communications system 100 that includes a call routing support system is shown. Communications system 100 includes a speech-enabled call routing system (SECRS) 118, such as an interactive voice response system having a speech recognition module. Communications system 100 also includes a plurality of potential call destinations. Illustrative call destinations shown include service departments, such as billing department 120, balance information 122, technical support 124, employee directory 126, and new customer service departments 128. In practice, communication network 116 may receive calls from a variety of callers, such as the illustrated callers 110, 112, and 114. In a particular embodiment, communication network 116 may be a public telephone network, a wireless telephone network, a voice over Internet protocol (VoIP) type network, or some other network capable of supporting communication. As depicted, SECRS 118 may include components, such as a processor 142, memory 143, a synonym table 144, and a routing module 140. Depending upon implementation details, SECRS 118 may be coupled to and may route calls to various destinations across a LAN, an Intranet, an extranet, the Public Internet, and/or some other communication link or network, as shown. In addition, SECRS 118 may route calls to an agent, such as the illustrated live operator 130.

An illustrative embodiment of SECRS 118 may be a call center having a plurality of agent terminals attached. Thus, while only a single operator 130 is shown in FIG. 1, it should be understood that a plurality of different agent terminals or types of terminals may be coupled to SECRS 118, such that a variety of agents may service incoming calls. Moreover, and as indicated above, SECRS 118 may be operable as an automated call routing system.

Figure 2:
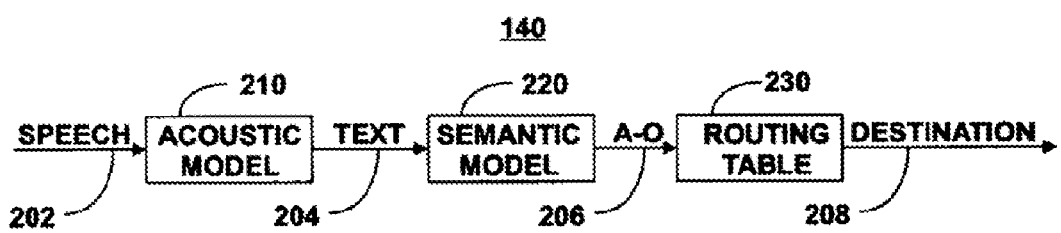
FIG. 2 is a general diagram that illustrates a method of routing calls.

In a particular embodiment, action-object routing module 140 includes an action-object lookup table for matching action-object pairs to desired call routing destinations. This process may be better understood through consideration of FIG. 2. Referring to FIG. 2, an illustrative block diagram of SECRS 118 is depicted. In this particular embodiment, processor 142 in SECR 118 includes an acoustic processing model 210, semantic processing model 220, and action-object routing table 230. In a first conversion, acoustic model 210 may receive speech input 202 and provide text as its output 204. Semantic model 220 may receive text 204 directly or indirectly from acoustic model 210 and produce an action-object table containing salient terms of the speech. The action(s) and object(s) in the action-object table may be ordered or ranked according to a confidence level. The confidence level may be used to indicate how likely a given action or object reflects a correct and useable customer instruction.

When a speech input conversion creates a dominant action (e.g., an action has the highest confidence level in the action-object list), a system like SECRS 118 of FIG. 1 may review the existing object list and readjust the confidence level of the objects. The call may then be routed based on several criteria, such as the overall highest confidence level in the action-object list (a dominant list entry) and the highest confidence level complimentary term from the secondary conversion (a complement to the dominant entry).

The high scoring action may have been selected, the actions may have been masked, and objects that are inconsistent with the selected action may be tagged as invalid. Examples of invalid action-object combinations can be understood by referring to FIG. 5, where objects are listed on the left of the chart, and actions are listed across the top of the chart. For example, if the action of "acquire" has the highest confidence level in the action-object list then during the secondary conversion, objects such as "bill," "payment," "other providers," "coupon specials" "name/number" and "store locations" may be masked or tagged as invalid selections.

Based on the call routing destination 208, a call received at a call routing network like SECRS 118 may be routed to a final destination, such as the billing department 120 or the technical support service destination 124 depicted in FIG. 1. In a particular embodiment, the action-object routing table 230 may be a look up table or a spreadsheet, such as a Microsoft Excel™ spreadsheet.

Figure 3:
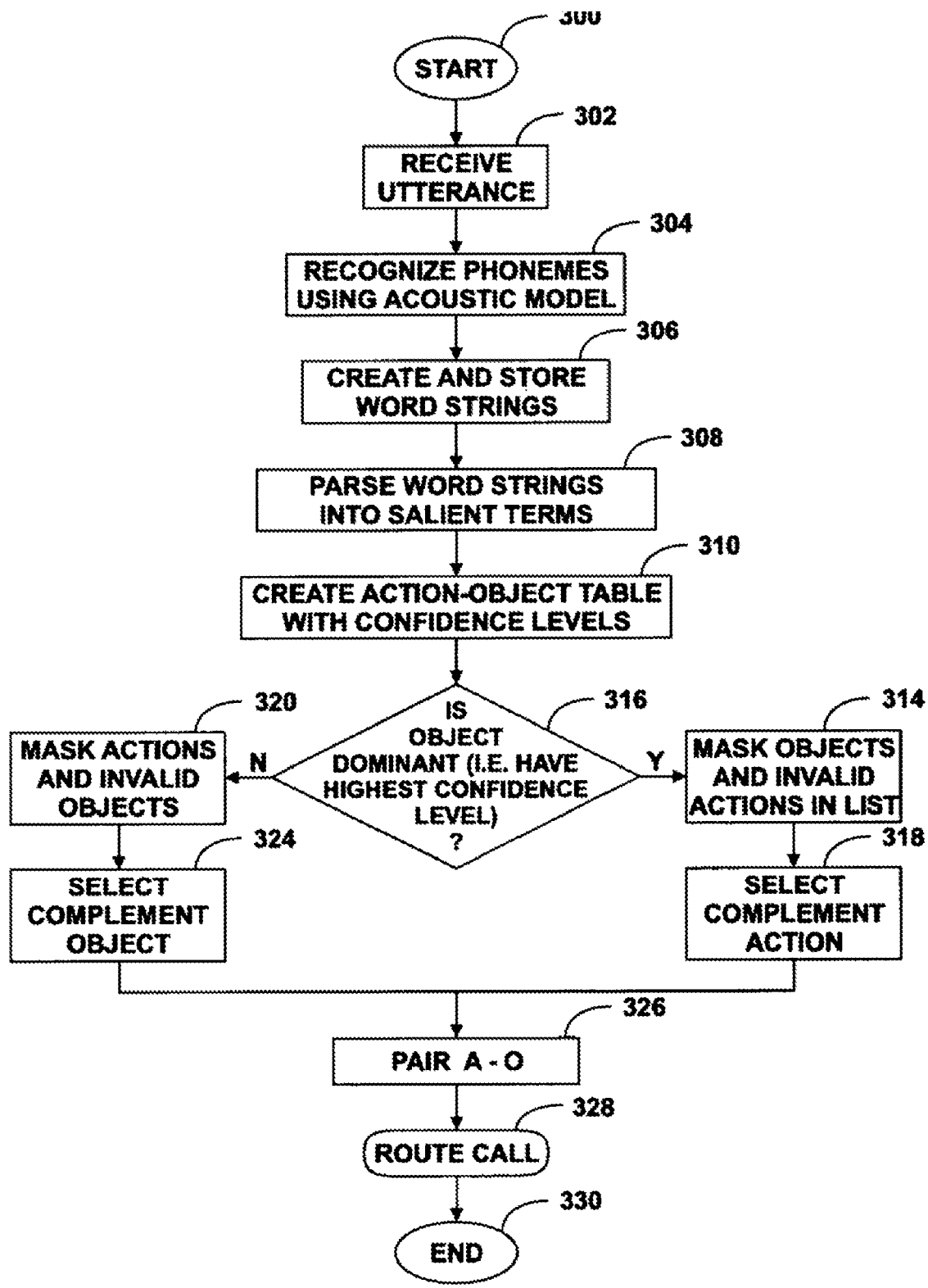
FIG. 3 is a flow diagram that illustrates a method of processing and routing calls.

Referring to FIG. 3, an illustrative embodiment of a method of processing a call using an automated call routing system such as the system of FIG. 1 is illustrated. The method starts at 300 and proceeds to step 302 where a speech input signal, such as a received utterance, is received or detected. Using phonemes or some other effective techniques, the received speech input may be converted into a plurality of word strings or text in accordance with an acoustic model, as shown at steps 304 and 306. In a particular embodiment, probability values may be assigned to word strings based on established rules and the content and coherency of the word string. At step 308, the word strings may be parsed into objects and actions. Objects generally represent nouns and adjective-noun combinations, while actions generally represent verbs and adverb-verb combinations. The actions and objects are assigned confidence values or probability values based on how likely they are to reflect the intent of the caller. In a particular embodiment a probability value or confidence level for the detected action and the detected object is determined utilizing a priority value of the word string used to create the selected action and the selected object.

In some cases, many possible actions and objects may be detected or created from the word strings. A method incorporating teachings of the present disclosure may attempt to determine and select a most probable action and object from a list of preferred objects and actions. To aid in this resolution, a synonym table such as the synonym table of FIG. 4 may be utilized to convert detected actions and objects into actions and objects that the system expects and/or is configured to "listen for." Thus, detected objects and actions may be converted to expected actions and objects and assigned a confidence level. The process may also utilize the synonym table, for example, to adjust confidence levels of the actions and objects. The synonym table may store natural language phrases and their relationship with a set of actions and objects. In practice, natural language spoken by the caller may be compared to the natural language phrases in the table. Using the synonym table, the system and method may map portions of the natural phrases to detected objects and maps portions of the natural spoken phrase to detected actions. Thus, the word strings can be converted into salient objects and actions, at step 308.

In summary, at step 310 multiple actions and multiple objects can be identified from the list of salient terms and assigned a confidence level according to the likelihood that a particular action or object identifies a customer's intent and thus will lead to a successful routing of the call. The confidence level can be assigned to an action or an object based on many criteria such as text similarity, business rules etc., in step 310. In a particular example, a callers' number (caller ID) may be utilized to assign a high confidence value to the action "acquire," and a low confidence value the actions "change," or "cancel," if the caller does not currently have service. In the event that a confidence level for an action-object pair is below a predetermined level, the call may be routed to a human operator or agent terminal.

In decision step 312 the action or object with the highest confidence level is selected and marked as the dominant term. After a dominant term is selected, the method proceeds to find a complement for the dominant term. For example, if the dominant term is an object the complement will be an action and visa-versa. If an action is dominant all other actions in the action-object list can be invalidated, tagged or masked and objects that are inconsistent with the dominant action can also be tagged as invalid as in step 320. The process of invalidating objects based on a dominant action can be further explained by referring to FIG. 5 where objects are listed on the left of the chart and actions are listed across the top of the chart. For example, if the action of "cancel" is dominant in the action-object list then the objects "bill," "payment," "other providers," "coupon specials" "name/number" and "store locations" are masked or tagged as invalid selections because, for example, a caller would not want to "cancel-store locations." Thus, the complementary selection process can ignore objects and invalid actions when a dominant object has been selected. The entries at the intersection of actions and objects in FIG. 5 illustrate routing destinations or phone extension where a call can be routed when the system determines a dominant entry and its complement. Based on the dominant action, the highest confidence level object is selected as a complement the dominant action at step 334. The dominant action and the complementary object are combined to form an action-object pair at step 330.

When it is determined that an object is dominant (i.e. has the highest confidence level in the object-action table) at step 312, a search for a complementary action is conducted. Objects remaining in the action-object list and actions that are inconsistent with the dominant object are masked or tagged as invalid as in step 314. The search for a complementary action can ignore objects and invalid actions. The method again refers to the object-action list to select a complementary action having the highest confidence level to complement the dominant object in step 318. An object-action pair is created at step 326 and the call is routed at step 328 and the process ends at 330.

In practice, it may be beneficial to convert word strings such as "I want to have" to actions such as "get." This substantially reduces the size of the action and object tables. As shown in FIG. 4, differently expressed or "differently spoken" inputs that have the same or similar caller intent may be converted to a single detected action-object, and/or action-object pair. Further, improper and informal sentences as well as slang may be connected to an action-object pair that may not bear phonetic resemblance to the words uttered by the caller. With a mapped lookup table, such as the table in FIG. 4, speech training and learning behaviors found in conventional call routing systems may not be required. The tables in the present disclosure may be updated easily, leading to a lower cost of system maintenance.

The above-disclosed subject matter is to be considered illustrative, and not restrictive, and the appended claims are intended to cover all such modifications, enhancements, and other embodiments that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method, comprising:
   recognizing, at a call routing system comprising a processor and a memory, phonemes of an utterance using an acoustical model;
   creating word strings based on the recognized phonemes of the utterance;
   parsing the word strings to identify actions and objects;
   creating a table comprising terms, the terms including the actions and the objects;
   identifying a dominant term of the table via the processor;
   when the dominant term is an action, masking actions of the table that are not the dominant term and masking objects of the table that are identified as invalid objects with reference to the dominant term;
   when the dominant term is an object, masking objects of the table that are not the dominant term, masking actions of the table that are identified as invalid actions with reference to the dominant term, determining a corresponding confidence level of each action of the table based on the dominant term, and modifying the corresponding confidence level of each action of the table based on a likelihood that the action is consistent with the dominant term;
   selecting a particular term from the table as a complementary term and pairing the complementary term with the dominant term to form an action-object pair; and
   routing a call received by the call routing system based on the action-object pair.

2. The computer-implemented method of claim 1, further comprising, when the dominant term is an action, determining a corresponding confidence level of each object of the table, wherein the corresponding confidence level of each object is based on the dominant term.

3. The computer-implemented method of claim 2, wherein, when the dominant term is an action, determining the corresponding confidence level of each object of the table further comprises modifying the corresponding confidence level of each object of the table based on a likelihood that the object is consistent with the dominant term.

4. The computer-implemented method of claim 1, further comprising assigning the corresponding confidence level to each action of the table.

5. The computer-implemented method of claim 1, wherein the actions include at least one of a verb and an adverb-verb combination.

6. The computer-implemented method of claim 1, wherein the objects include at least one of a noun and an adjective-noun combination.

7. The computer-implemented method of claim 1, wherein each of the confidence levels represents a probability that a corresponding term represents an intent of a caller.

8. The computer-implemented method of claim 1, further comprising adjusting the confidence level associated with at least one of the terms in the table based upon the dominant term.

9. A system, comprising:
   a processor;
   a memory including a call routing module that, when executed by the processor, causes the processor to:
      receive a speech utterance;
      identify a term of a table as a dominant term, the table comprising terms including actions and objects based on the speech utterance;
      when the dominant term is an action, mask actions of the table that are not the dominant term and mask objects of the table that are invalid objects with reference to the dominant term; and
      when the dominant term is an object, mask objects of the table that are not the dominant term, mask actions of the table that are invalid actions with reference to the dominant term, determine a confidence level of each action of the table based on the dominant term, and modify the confidence level of each action of the table based on a likelihood that the action is consistent with the dominant term; and
   a pairing module to select a particular term from the table as a complementary term and pair the complementary term with the dominant term to form an action-object pair,
   wherein the call routing module is executable by the processor to route a call to a destination based on the action-object pair.

10. The system of claim 9, wherein the call routing module is operable to assign the confidence level to each object of the table when the dominant term is an action and to assign the confidence level to each action of the table when the dominant term is an object, wherein each confidence level is based at least in part on the dominant term.

11. The system of claim 10, wherein each of the confidence levels represents a probability that a corresponding term represents an intent of a caller.

12. The system of claim 10, wherein the dominant term is selected based at least in part on the confidence level of each action and of each object in the table.

13. The system of claim 9, wherein the call routing module is configured to adjust the associated confidence level of at least one of the terms in the table based upon the dominant term identified.

14. A system, comprising:
an acoustic input engine configured to accept a speech input, to recognize phonemes of the speech input, and to create word strings based on the recognized phonemes;
a semantic engine coupled to the acoustic engine and operable to identify actions and to identify objects by parsing the word strings;
an action-object pairing system to identify a dominant entry from the identified actions and the identified objects, to select a complement to the dominant entry, to form an action-object pair that includes the dominant entry and the complement, and when the dominant entry is an object, to mask objects of the table that are not the dominant entry, to mask actions of the table that are invalid actions with reference to the dominant entry, to determine a confidence level of each action of the table based on the dominant entry, and to modify the confidence level of each action of the table based on a likelihood that the action is consistent with the dominant entry;
an action-object routing table operable to provide a routing destination based on the action-object pair; and
a call routing module to route a call to the routing destination.

15. The system of claim 14, wherein the identified actions include at least one of acquire, cancel, change, inquire, inform, and how to use.

16. The system of claim 14, wherein the identified objects include at least one of digital subscriber line (DSL), basic service, call notes, caller identification (ID), bill payment, other providers, coupon specials, names and number, and store locations.

17. The system of claim 14, wherein the complement to the dominant entry is selected based on a likelihood of consistency with the dominant entry.

18. The system of claim 14, wherein, before selecting the complement to the dominant entry, the action-object pairing system is operable to mask at least one of the identified actions and at least one of the identified objects.

19. The system of claim 18, wherein the identified actions that are not the dominant entry are masked and wherein the identified objects that are determined to be invalid objects with reference to the dominant entry are masked when the dominant entry is an action.

20. The system of claim 18, wherein the identified objects that are not the dominant entry are masked and wherein the identified actions that are determined to be invalid actions with reference to the dominant entry are masked when the dominant entry is an object.

* * * * *